US006803130B1

(12) United States Patent
Tomono et al.

(10) Patent No.: US 6,803,130 B1
(45) Date of Patent: Oct. 12, 2004

(54) COMPOSITE MAGNETIC MATERIAL AND INDUCTOR ELEMENT

(75) Inventors: Kunisaburo Tomono, Otsu (JP); Takashi Toda, Kusatsu (JP); Takashi Ohsawa, Shiga-ken (JP); Mitsuhiro Fukushima, Shiga-ken (JP); Hiroshi Marusawa, Miroyama (JP)

(73) Assignee: Murata Manufacturing Co. Ltd. (JP)

( * ) Notice: Subject to any disclaimer, the term of this patent is extended or adjusted under 35 U.S.C. 154(b) by 155 days.

(21) Appl. No.: 09/697,542

(22) Filed: Oct. 26, 2000

(30) Foreign Application Priority Data

Oct. 27, 1999 (JP) .......................................... 11-305012

(51) Int. Cl.[7] .................................................. B32B 9/00
(52) U.S. Cl. ...................................... 428/692; 428/702
(58) Field of Search ................................ 428/692, 702, 428/900; 336/110, 223

(56) References Cited

U.S. PATENT DOCUMENTS

| | | | | | |
|---|---|---|---|---|---|
| 3,609,083 A | * | 9/1971 | Slick | 252/62.62 |
| 4,268,430 A | * | 5/1981 | Suzuki et al. | 524/440 |
| 4,282,302 A | * | 8/1981 | Makino et al. | 430/106.2 |
| 4,485,162 A | * | 11/1984 | Imamura et al. | 430/111.31 |
| 5,206,620 A | * | 4/1993 | Watanabe et al. | 252/62.58 |
| 5,698,336 A | * | 12/1997 | Hashimoto et al. | 428/694 B |
| 5,756,207 A | * | 5/1998 | Clough et al. | 428/375 |
| 5,846,449 A | * | 12/1998 | Taguchi et al. | 252/62.62 |
| 5,906,768 A | * | 5/1999 | Kakinuma et al. | 252/62.6 |
| 6,028,353 A | * | 2/2000 | Nakano et al. | 257/701 |
| 6,033,594 A | * | 3/2000 | Enokido et al. | 252/62.62 |
| 6,071,430 A | * | 6/2000 | Lebourgeois et al. | 252/62.6 |
| 6,127,296 A | * | 10/2000 | Uchikoba | 252/62.58 |
| 6,338,900 B1 | * | 1/2002 | Tada et al. | 428/402 |

FOREIGN PATENT DOCUMENTS

| | | | |
|---|---|---|---|
| JP | 59-213628 A | * | 12/1984 |
| JP | 06-140229 A | * | 5/1994 |
| JP | 07-037711 | | 2/1995 |
| JP | 07-037711 A | * | 2/1995 |
| JP | 07-192909 | | 7/1995 |
| JP | 09-007815 A | * | 1/1997 |
| JP | 10-335131 | | 12/1998 |

OTHER PUBLICATIONS

English Translation of JP 07–037711.*
JPO Abstract Translation of JP 06–140229 A (JP406140229A).*
Machine Translation of JP 06–140229–A.*
Derwent Abstract Translation of JP 10–335131–A (Derwent Acc No. 1999–1111845).*
Machine Translation of JP 10–335131–A.*
Derwent Abstract Translation of JP–07–037711–A (Derwent Acc No 1995–11895).*
Derwent Abstract Translation of JP–09–007815–A (Derwent Acc No 1997–124513.*
Derwent Abstract Translation of JP–59–213628–A (Derwent Acc No 1985–016175).*
Machine Translation of JP–07–037711–A.*
Machine Translation of JP–09–007815–A.*
Japanese Examination Report dated Mar. 4, 2003, (w/ English translation of relevant portion).
Japanese Office Action issued Aug. 23, 2002 (w/ relevant English translation).

* cited by examiner

*Primary Examiner*—Kevin M. Bernatz
(74) *Attorney, Agent, or Firm*—Dickstein, Shapiro, Morin & Oshinsky, LLP.

(57) ABSTRACT

A composite magnetic material comprises a ferrite powder and a resin in which the powder comprises a spinel type ferrite including at least Ni and Co.

21 Claims, 3 Drawing Sheets

COMPOSITE MAGNETIC MATERIAL AND INDUCTOR ELEMENT

BACKGROUND OF THE INVENTION

1. Field of the Invention

The present invention relates to a composite magnetic material comprising a ferrite powder and a resin, and an inductor element constructed by using it. More specifically, it relates to a composite magnetic material and an inductor element advantageous for use in the electronic parts for high-frequency applications.

2. Description of the Related Art

In high-frequency circuits which are used for mobile communication devices including a portable telephone, a radio LAN, etc., an inductor element with a coil structure for covering the frequencies up to several GHz, such as a chip inductor, is used for the purposes of impedance matching, resonance or for a choke.

However, the coil was prepared by winding a wire around a core made of a non-magnetic material or by forming a coil pattern on a non-magnetic material, and thus it was necessary to have a large number of coil winding turns so as to obtain a desired impedance, resulting in a restraint toward the development of miniaturization. Since the resistance of the winding increases with increasing number of winding turns, there was also a problem that an inductor with a high Q (gain) could not be obtained.

To solve these problems, inductors having, as a core, a ferrite for high-frequency use, have been also investigated. By using a ferrite core, it is possible to decrease the number of coil winding turns in accordance with the permeability of the core material, and to realize miniaturization. However, a ferrite sintered body has a frequency relaxation phenomenon derived from magnetic domain wall motion, and a high Q can be maintained only when the frequency is restricted to a value up to about 300 MHZ at the most, even if a ferrox planer type ferrite sintered body (which is believed to have the most excellent high-frequency properties) is used.

SUMMARY OF THE INVENTION

It is therefore an object of the present invention to provide a magnetic material which has a larger permeability in comparison with a non-magnetic material in a frequency band of from several MHZ to several GHz, and can maintain a relatively high gain Q up to a frequency band of several GHz.

Another object of the present invention is to provide an inductor element which can be miniaturized and still can provide a high Q, by using the magnetic material described above.

The composite magnetic material comprises a ferrite powder and a resin, and the said ferrite powder comprises a spinel type ferrite including at least Ni and Co.

It is preferable that the ferrite is a spinel type ferrite having a composition represented by $(NiO)_x(CoO)_y(MeO)_z(Fe_2O_3)_{1-x-y-z}$, wherein Me is at least one selected from the group consisting of Mg, Cu and Zn, and x, y and z each satisfy the following conditions:

$0.10 \leqq x \leqq 0.550$;

$0.025 \leqq y \leqq 0.200$;

$0 \leqq z \leqq 0.200$; and $0.400 \leqq (x+y+z) \leqq 0.600$.

The composite magnetic material is suitably applied to an inductor element.

According to the present invention, a composite magnetic material can be obtained which can provide a relatively large permeability in the frequency band of from several MHZ to several GHz, and which can maintain a high gain Q up to a GHz range.

Therefore, an inductor element constructed by using this composite magnetic material as a magnetic member, can realize miniaturization as well as a high Q.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
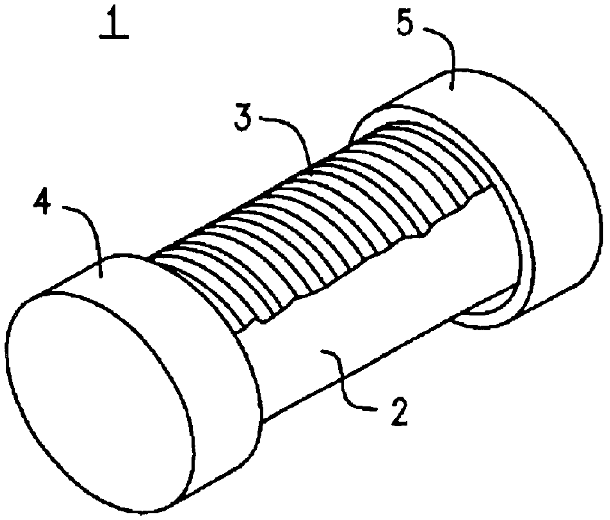
FIG. 1 is a perspective view illustrating an inductor element 1 according to an embodiment of the present invention, with a part partially broken.

A ferrite sintered member material has a magnetization mechanism that it passes through the stage of magnetic domain wall motion relaxation to reach the stage of rotational magnetization resonance starting from a low frequency to a high frequency in the AC magnetic field. From the viewpoint of frequency characteristics of Q of magnetic materials, Q decreases sharply at a frequency in which magnetic domain wall motion relaxation occurs, and further decreases toward the rotational magnetization resonance point.

To maintain a high Q value up to a frequency band of several GHz, it is first necessary to stop the magnetic domain wall motion completely, and then to shift the rotational magnetization resonance frequency to a frequency which is higher than several GHz.

As a result of intensive researches by the inventors, it was confirmed that degradation of Q by the magnetic domain wall motion can be completely stopped by dispersing a ferrite powder in a non-magnetic matrix, the powder having such a particle size that allows each of the ferrite particles to remain a single domain particle. In general, the maximum dimension of each particle in the powder will be about 3 $\mu$m.

It was also found that when Ni in a Ni ferrite is substituted with Co, the rotational magnetization resonance frequency becomes higher with increasing of the substituted amount.

The inventors of the present invention noticed that properties favorable for a core for a high-frequency inductor can be obtained by combining the above-described elements and by dispersing a NiCo ferrite powder in a resin at a high concentration to make a composite ferrite material, and found the present invention.

In other words, the present invention is directed at a composite magnetic material. This composite magnetic material is characterized in that it contains a ferrite powder and a resin, the ferrite powder comprising a spinel type ferrite including at least Ni and Co.

In the composite magnetic material according to the present invention, the above-described ferrite is desirably a spinel type ferrite having a composition represented by $(NiO)_x(CoO)_y(MeO)_z(Fe_2O_3)_{1-x-y-z}$, wherein Me is at least one selected from the group consisting of Mg, Cu and Zn, and x, y and z each satisfy the following conditions: $0.10 \leqq x \leqq 0.550$; $0.025 \leqq y \leqq 0.200$; $0 \leqq z \leqq 0.200$; and $0.400 \leqq (x+y+z) \leqq 0.600$.

In the above-described composition, a part of the Ni may be substituted with Be, Ca, Sr, Ba, Ti, V, Cr, Me, etc., and a part of the Fe may be substituted with Al, Ga, In, Tl, etc., as long as they do not adversely affect on the magnetic properties of the composite magnetic material.

For the resin, any type of resin may be used. Additives such as a resin dispersant may be added to the resin as long as they do not adversely affect on the magnetic properties of the composite material.

The composite magnetic material according to the present invention is prepared, different from a ferrite sintered body, by mixing a ferrite powder without magnetic domain wall motion relaxation in a resin. This composite magnetic material can maintain a relatively high Q up to several GHz region since the rotational magnetization resonance frequency of a ferrite powder is raised to a frequency higher than several GHz.

FIG. 1 is a perspective view illustrating the appearance of an inductor element 1 according to an embodiment of the present invention. In FIG. 1, the inductor element 1 is shown as partially broken.

The inductor element 1 constitutes a chip inductor, and is equipped with a cylindrical core 2. A coated winding 3 is wound over the outer periphery of the core 2. Each end of the core 2 is covered with a cap type metallic terminal member 4 or 5.

The coating of both ends of the winding 3 is peeled off and one of the ends with the coating thus peeled off is electrically connected to the terminal member 4, and the other end is electrically connected to the terminal member 5, respectively.

The composite magnetic material according to the present invention can be used advantageously, for example, as a material for constituting a core 2 for use in the above-described inductor element 1, or as a magnetic member for use in an inductor element of a different structure.

The composite magnetic material according to the present invention has the above-described composition. The details will be explained below based on the examples.

EXAMPLES

Various kinds of metal oxides as raw materials were prepared and wet blended with a ball mill for 24 hours to make ferrite compositions (in molar ratio) shown in Table 1.

TABLE 1

| Sample No. | NiO | CoO | MgO | CuO | ZnO | $Fe_2O_3$ |
|---|---|---|---|---|---|---|
| * 1 | 0.050 | 0.200 | 0 | 0.150 | 0 | 0.600 |
| 2 | 0.100 | 0.200 | 0 | 0.100 | 0 | 0.600 |
| 3 | 0.550 | 0.050 | 0 | 0 | 0 | 0.400 |
| * 4 | 0.575 | 0.025 | 0 | 0 | 0 | 0.400 |
| 5 | 0.505 | 0 | 0 | 0 | 0 | 0.495 |
| * 6 | 0.495 | 0.010 | 0 | 0 | 0 | 0.495 |
| 7 | 0.480 | 0.025 | 0 | 0 | 0 | 0.495 |
| 8 | 0.455 | 0.050 | 0 | 0 | 0 | 0.495 |
| 9 | 0.405 | 0.100 | 0 | 0 | 0 | 0.495 |
| 10 | 0.355 | 0.150 | 0 | 0 | 0 | 0.495 |
| 11 | 0.305 | 0.200 | 0 | 0 | 0 | 0.495 |
| *12 | 0.255 | 0.250 | 0 | 0 | 0 | 0.495 |
| *13 | 0.205 | 0.300 | 0 | 0 | 0 | 0.495 |
| 14 | 0.405 | 0.050 | 0.050 | 0 | 0 | 0.495 |
| 15 | 0.405 | 0.050 | 0 | 0.050 | 0 | 0.495 |
| 16 | 0.405 | 0.050 | 0 | 0 | 0.050 | 0.495 |
| 17 | 0.305 | 0.100 | 0.100 | 0 | 0 | 0.495 |
| 18 | 0.205 | 0.100 | 0.200 | 0 | 0 | 0.495 |
| *19 | 0.105 | 0.100 | 0.300 | 0 | 0 | 0.495 |
| *20 | 0.550 | 0.100 | 0 | 0 | 0 | 0.350 |
| 21 | 0.500 | 0.100 | 0 | 0 | 0 | 0.400 |
| 22 | 0.450 | 0.100 | 0 | 0 | 0 | 0.450 |
| 23 | 0.350 | 0.100 | 0 | 0 | 0 | 0.550 |
| 24 | 0.300 | 0.100 | 0 | 0 | 0 | 0.600 |
| *25 | 0.250 | 0.100 | 0 | 0 | 0 | 0.650 |

Next, the above-described mixed powder was calcined in the air at a temperature of 1,000° C. for 2 hours, and then was wet-ground with a ball mill for 24 hours.

The ferrite powder thus obtained was subjected to a measurement of the real density by the gas substitution method. Using the result, the ferrite powder and a polypropylene resin were compounded in a volume ratio of 50/50 to prepare a composite material.

Next, the above-described composite material was blended with a hot roll, and then was compression-pressed to make a cylindrical test piece having a diameter of 8 mm and an axial line direction length of 15 mm. The test piece was lathed, and then was subjected to the evaluation of magnetic properties at frequencies of 500 MHZ, 1 GHz and 2 GHz, respectively, by the S-parameter method.

Also, as a comparative example, a Ni (Mg, Cu) ferrite sintered body was prepared, and was subjected to the evaluation of magnetic properties according to the same methods as the above-described methods.

Table 2 shows the real number parts $\mu'$ of complex permeabilities and the gain Q values of the composite magnetic materials from the samples in Table 1 for which magnetic properties were evaluated as described above, and a sintered body according to the above-described comparative example, respectively.

TABLE 2

| Sample | $\mu'$ | | | G | | |
|---|---|---|---|---|---|---|
| No. | 500 MHz | 1 GHz | 2 GHz | 500 MHz | 1 GHz | 2 GHz |
| *1 | 1.2 | 1.2 | 1.2 | 200 | 200 | 190 |
| 2 | 1.5 | 1.5 | 1.5 | 190 | 190 | 190 |
| 3 | 1.8 | 1.8 | 1.7 | 190 | 190 | 170 |
| *4 | 1.3 | 1.3 | 1.3 | 190 | 190 | 180 |
| *5 | 2.5 | 2.5 | 2.2 | 18 | 8 | 4 |
| *6 | 2.5 | 2.8 | 2.4 | 80 | 10 | 2 |
| 7 | 2.2 | 2.2 | 2.1 | 150 | 150 | 80 |
| 8 | 2.0 | 2.0 | 2.0 | 180 | 180 | 150 |
| 9 | 1.8 | 1.8 | 1.8 | 180 | 180 | 160 |
| 10 | 1.7 | 1.7 | 1.7 | 180 | 180 | 160 |

TABLE 2-continued

| Sample | μ' | | | G | | |
|---|---|---|---|---|---|---|
| No. | 500 MHz | 1 GHz | 2 GHz | 500 MHz | 1 GHz | 2 GHz |
| 11 | 1.5 | 1.5 | 1.5 | 190 | 190 | 170 |
| *12 | 1.2 | 1.2 | 1.2 | 200 | 200 | 190 |
| *13 | 1.1 | 1.1 | 1.1 | 200 | 200 | 200 |
| 14 | 1.8 | 1.8 | 1.8 | 180 | 180 | 160 |
| 15 | 1.8 | 1.8 | 1.8 | 180 | 180 | 150 |
| 16 | 2.2 | 2.2 | 2.2 | 100 | 100 | 80 |
| 17 | 2.0 | 2.0 | 2.0 | 160 | 160 | 150 |
| 18 | 2.2 | 2.2 | 2.1 | 160 | 160 | 140 |
| *19 | 2.6 | 2.6 | 2.5 | 100 | 10 | 4 |
| *20 | 1.3 | 1.3 | 1.3 | 200 | 200 | 200 |
| 21 | 1.7 | 1.7 | 1.6 | 190 | 190 | 180 |
| 22 | 1.8 | 1.8 | 1.8 | 180 | 180 | 160 |
| 23 | 1.8 | 1.8 | 1.8 | 180 | 180 | 170 |
| 24 | 1.6 | 1.6 | 1.6 | 190 | 190 | 190 |
| *25 | 1.2 | 1.2 | 1.2 | 200 | 200 | 200 |
| Comparative example | 7.6 | 4.9 | 2.6 | 2 | <1 | <1 |

Figure 2:
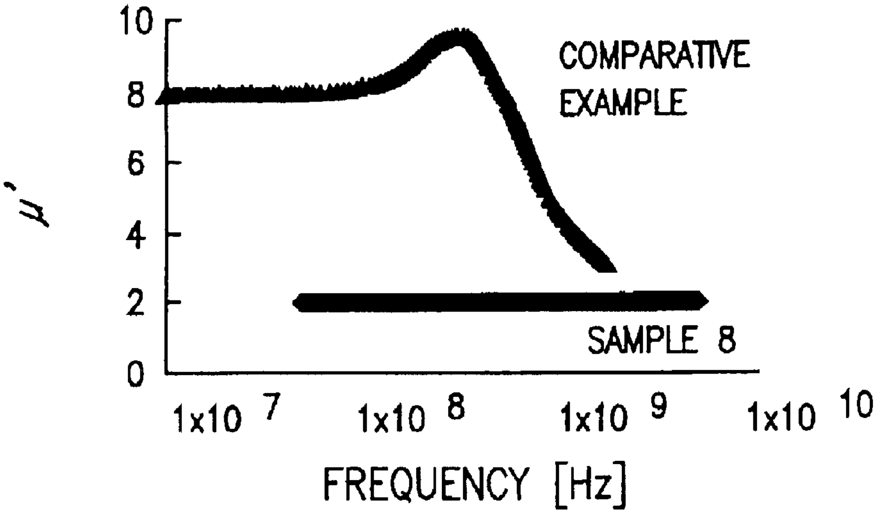
FIG. 2 is a graph showing relationships between the frequencies and the permeabilities $\mu'$ of the composite magnetic material of sample 8 prepared according to the present invention, and a ferrite sintered body of the ail comparative example.
Figure 3:
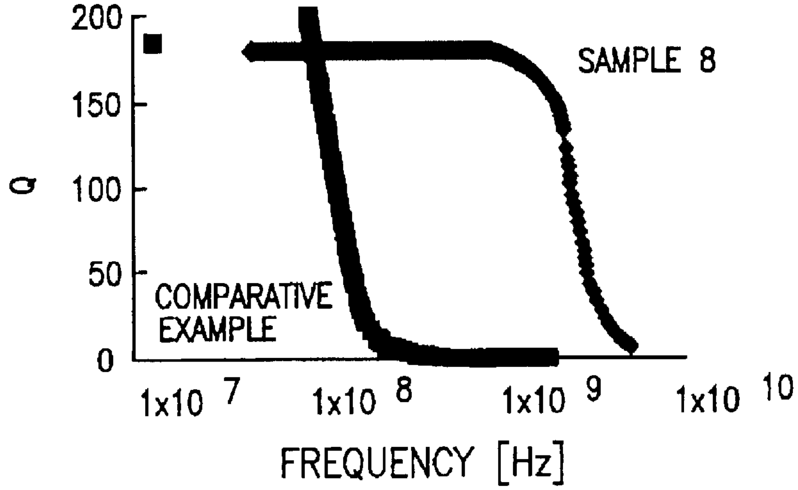
FIG. 3 is a graph showing relationships between the frequencies and the gains Q of the composite magnetic material of sample 8 prepared according to the present invention, and a ferrite sintered body of the comparative example.
Figure 4:
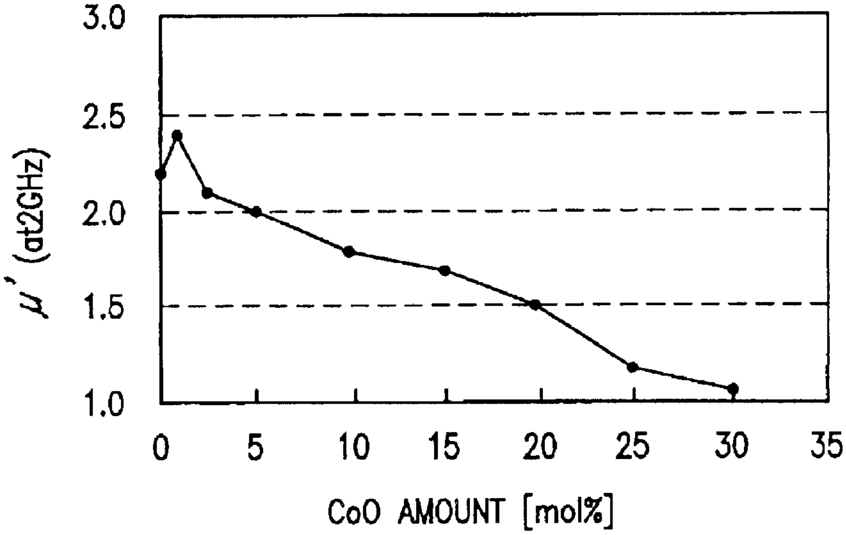
FIG. 4 is a graph showing a relationship between the CoO amount and the permeability m' in the system with 49.5 mol % of $Fe_2O_3$.
Figure 5:
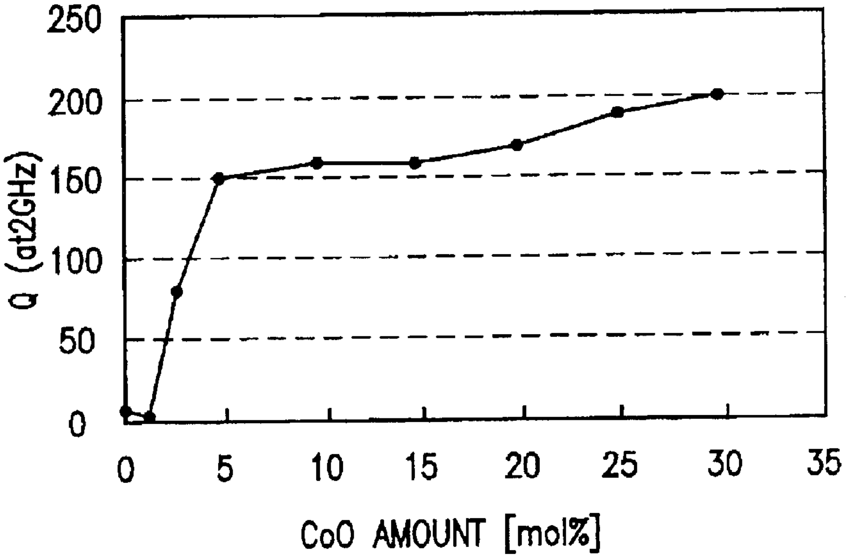
FIG. 5 is a graph showing a relationship between the CoO amount and the gain Q in the system with 49.5 mol % of $Fe_2O_3$.

FIG. 2 shows relationships between the frequencies and permeabilities μ' of Sample 8 and the comparative example to compare them. FIG. 3 shows relationships between the frequencies and the gains Q in a similar way. FIG. 4 shows a relationship between the CoO amount and the permeability μ' at a frequency of 2 GHz in a system with 49.5 mol % of $Fe_2O_3$. FIG. 5 shows a relationship between the CoO amount and the gain Q at a frequency of 2 GHz on a similar way.

When FIG. 2, FIG. 3 and Table 2 are referenced, in comparison with the comparative example, samples 1 to 25, except for sample 5 which is outside of the present invention as it does not contain Co, have a tendency to show, in general, relatively good magnetic properties, that is, a good permeability μ' and a good gain Q up to the GHz region, without decrease of magnetic properties derived from magnetic wall resonance, though the permeability is decreased by the influence of the resin which is non-magnetic.

With reference to Table 1, the amount of NiO is changed in the range of 0.050–0.575 mol % in samples 1–4, the amount of CoO is changed in the range of 0–0.300 mol % in samples 5–13, a part of the amount of NiO is substituted with MgO, CuO or ZnO in samples 14–19, and the amount of MgO is changed in the range of 0.050–0.300 mol %, and the amount of $Fe_2O_3$ is changed in the range of 0.350–0.650 mol % in samples 20–25.

In a preferred embodiment according to the present invention, as described above, the ferrite is a spinel type ferrite having a composition represented by $(NiO)_x(CoO)_y(MeO)_z(Fe_2O_3)_{1-x-y-z}$, wherein Me is at least one selected from the group consisting of Mg, Cu and Zn, and x, y and z each satisfy the following conditions: $0.10 \leqq x \leqq 0.550$; $0.025 \leqq y \leqq 0.200$; $0 \leqq z \leqq 0.200$; and $0.400 \leqq (x+y+z) \leqq 0.600$.

In Table 1 and Table 2, those out of the category of this preferred embodiment have sample numbers marked with the symbol "*".

The range of composition which is in this range of preferred embodiment of the present invention can be confirmed by referencing Table 1 and Table 2.

In samples 1–4, samples 2 and 3 are within the preferred range, and samples 1 and 4 are out of the preferred range. When samples 1–4 are compared with each other, sample 1 with a NiO amount of less than 0.10 in molar ratio and sample 4 with a NiO amount of more than 0.550 in molar ratio have lower permeabilities μ' than those of samples 2 and 3.

In samples 5–13, samples 7–11 are within the preferred range, and samples 5, 6, 12, and 13 are out of the preferred range. When samples 5–13 are compared with each other, those with CoO having a molar ratio of less than 0.025, such as samples 5 and 6, show a decreased gain Q, though a relatively high permeability μ' is obtained. On the other hand, when the amount of CoO exceeds 0.200 in molar ratio as is in the cases of samples 12 and 13, the permeability μ' decreases, though a relatively high gain Q is obtained.

The above-described behaviors can be confirmed by FIGS. 4 and 5. Thus, relatively good magnetic properties are observed both in the permeability μ' and the gain Q, when the amount of Co is not less than 2.5 mol % and not more than 20 mol %.

In samples 14–19, samples 14–18 are within the preferred range, and samples 19 is out of the preferred range. When MgO as a substituent exceeds 0.200 in molar ratio as in the case of sample 19, the gain Q decreases, though a relatively high permeability μ' is obtained.

Furthermore, in order to consider the effects obtained by substituting a part of Ni with Mg, Cu, or Zn as are shown in samples 14–19, comparison was made between sample 8 and samples 14–16, whereby the total molar ratio of NiO plus MgO, CuO or ZnO was the same. No large decrease in magnetic properties was observed. When samples 17–19 were compared with sample 9, a higher permeability μ' was obtained, though there was a tendency of decreasing in gain Q.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A composite magnetic material, comprising a ferrite powder and a resin, wherein said ferrite is a spinel type ferrite having a composition represented by $$(NiO)_x(CoO)_y(MeO)_z(Fe_2O_3)_{1-x-y-z}$$

wherein

Me is at least one selected from the group consisting of Mg, Cu and Zn, $0.10 \leqq x \leqq 0.550$;

$0.050 \leqq y \leqq 0.200$;

$0 \leqq z \leqq 0.200$; and $0.400 \leqq (x+y+z) \leqq 0.600$, and wherein the ferrite powder has a particle size which permits each of the ferrite particles to remain a single domain particle, and wherein the composite magnetic material possesses a real number part μ' of the complex permeability of at least 1.5 and a gain Q value of at least 80 when measured at a frequency of 2 GHz by the S-parameter method.

2. An inductor element equipped with a magnetic member comprising a sintered composite magnetic material according to claim 1.

3. A composite magnetic material according to claim 1, wherein x is 0.205–0.480, y is 0.05–0.1 and $0.450 \leqq (x+y+z) \leqq 0.550$.

4. An inductor element equipped with a magnetic member comprising a sintered composite magnetic material according to claim 3.

5. A composite magnetic material according to claim 3, wherein z is 0.

6. An inductor element equipped with a magnetic member comprising a sintered composite magnetic material according to claim 5.

7. A composite magnetic material according to claim 1, wherein Me is Mg and z>0.

8. An inductor element equipped with a magnetic member comprising a sintered composite magnetic material according to claim 7.

9. A composite magnetic material according to claim 1, wherein Me is Cu.

10. An inductor element equipped with a magnetic member comprising a sintered composite magnetic material according to claim 9.

11. A composite magnetic material according to claim 1, wherein Me is Zn.

12. An inductor element equipped with a magnetic member comprising a sintered composite magnetic material according to claim 11.

13. A composite ferrite material according to claim 1, wherein each of the ferrite particles has a particle size which does not exceed about 3 μm.

14. An inductor element equipped with a magnetic member comprising a sintered composite magnetic material according to claim 13.

15. A composite magnetic material, comprising a sintered combination of a ferrite powder and a resin, wherein said ferrite is a spinel type ferrite having a composition represented by $$(NiO)_x(CoO)_y(MeO)_z(Fe_2O_3)_{1-x-y-z}$$

wherein

Me is at least one selected from the group consisting of Mg, Cu and Zn, $0.10 \leqq x \leqq 0.550$;

$0.050 \leqq y \leqq 0.200$;

$0 \leqq z \leqq 0.200$; and $0.400 \leqq (x+y+z) \leqq 0.600$, and wherein the ferrite powder has a particle size which permits each of the ferrite particles to remain a single domain particle, and wherein the composite magnetic material possesses a real number part μ' of the complex permeability of at least 1.5 and a gain Q value of at least 80 when measured at a frequency of 2 GHz by the S-parameter method.

16. A composite magnetic material according to claim 15, wherein Me is Mg and z>0.

17. A composite magnetic material according to claim 15, wherein Me is Cu.

18. A composite magnetic material according to claim 15, wherein Me is Zn.

19. A composite ferrite material according to claim 15, wherein each of the ferrite particles has a particle size which does not exceed about 3 μm.

20. A composite magnetic material according to claim 15, wherein x is 0.205–0.480, y is 0.05–0.1 and $0.450 \leqq (x+y+z) \leqq 0.550$.

21. A composite magnetic material according to claim 20, wherein z is 0.

* * * * *